United States Patent [19]

Johnstone

[11] 4,383,939

[45] May 17, 1983

[54] POLYMERIZATION CATALYST

[75] Inventor: Alexander Johnstone, Stenhousemuir, Scotland

[73] Assignee: BP Chemicals Limited, London, England

[21] Appl. No.: 343,247

[22] Filed: Jan. 27, 1982

[30] Foreign Application Priority Data

Jan. 31, 1981 [GB] United Kingdom ............... 8103044

[51] Int. Cl.$^3$ .............................................. C08F 4/64
[52] U.S. Cl. ........................... 252/429 B; 252/429 C; 526/114; 526/115; 526/116; 526/119; 526/129
[58] Field of Search ....................... 252/429 B, 429 C

[56] References Cited

U.S. PATENT DOCUMENTS

| | | | |
|---|---|---|---|
| 3,114,744 | 12/1963 | Lasky | 252/429 C X |
| 3,166,542 | 1/1965 | Orzecnowski et al. | 252/429 C X |
| 3,859,267 | 1/1975 | Yamaguchi et al. | 252/429 C X |
| 4,199,475 | 4/1980 | Welch et al. | 252/429 C |
| 4,247,669 | 1/1981 | Reginato et al. | 252/429 C X |
| 4,284,748 | 8/1981 | Welch | 252/429 C X |

*Primary Examiner*—Patrick Garvin
*Attorney, Agent, or Firm*—Brooks, Haidt, Haffner & Delahunty

[57] ABSTRACT

A supported Ziegler catalyst component prepared by (A) reacting a refractory oxide support material having surface —OH groups, for example silica, with halogen-containing transition metal compound, eg titanium tetrachloride, (B) reacting the product with an organometallic compound, for example triethyl aluminium and (C) reacting with transition metal compound in which vanadium is present, for example vanadyl chloride. The catalyst component is conventionally activated with organometallic compound and can be used to polymerize 1-olefins, for example ethylene.

11 Claims, No Drawings

POLYMERIZATION CATALYST

The present invention relates to a supported Ziegler catalyst for polymerising 1-olefins and to a process for polymerising 1-olefins employing the catalyst.

It has long been known that 1-olefins such as ethylene can be polymerised by contacting them under polymerisation conditions with a catalyst obtained by activating a transition metal-containing component, e.g. a titanium compound such as titanium tetrachloride, with an activator or co-catalyst, e.g. an organo-metallic compound such as triethylaluminium. Catalysts comprising the transition metal-containing component and the co-catalyst or activator are generally referred to in the art as "Ziegler catalysts" and this terminology will be used throughout this specification.

The Ziegler catalyst component comprising the transition metal can be used either in an unsupported condition, or supported on support materials such as silicon carbide, calcium phosphate, silica, magnesium carbonate and sodium carbonate.

UK Patent Specification No. 1,256,851 discloses a catalyst for the low-pressure polymerisation and copolymerisation of olefins, comprising:

(a) an organometallic compound, or an organosilicon compound having at least one Si—H bond, and (b) a solid product obtained by reacting a substantially anhydrous support consisting of a solid bivalent-metal compound with an organometallic compound, or an organosilicon compound having at least one Si—H bond, this being either identical to or different from "(a)", separating the solid product resulting from the reaction, reacting this product with a halogenated derivative of a transition metal, and separating the final solid reaction product; the molar ratio of "(a)", to the transition metal chemically bonded to the support being at least 2.

UK Pat. No. 1,306,044 relates inter alia to a process for polymerising alpha-olefins using a catalyst comprising an organometallic compound and the solid product obtained by reacting silica or alumina with an excess of a compound of the formula $MR_nX_{m-n}$ wherein M is aluminium or magnesium, R is a hydrocarbon radical, X is hydrogen or halogen, m is the valency of M and n is a whole number not greater than m, separating and washing the solid product and reacting it with an excess of a halogen-containing transition metal compound and separating the solid reaction product.

U.S. Pat. No. 4,199,475 discloses a method for preparing a catalytic composite which can be converted to an active ethylene polymerisation catalyst by contacting the composite with a conventional organo-aluminium activator, the catalytic composite being prepared by (a) reacting an inorganic support containing surface hydroxyl groups with a compound chosen from among (1) compounds of the formula $Ti(OR)_nX_{4-n}$, (2) $VX_4$ and (3) $VO(OR^1)_mX_{3-m}$ wherein R is selected from among alkyl, cycloalkyl, aryl, acyl and combinations thereof with each group containing from 1 to about 20 carbon atoms, $R^1$ is an alkyl group containing from 1 to about 20 carbon atoms, m is 0 to 3, n is 0 to 4, and X is bromide, chloride, or iodide, to form a first composition; and thereafter (b) reacting said first composition with a compound of titanium or vanadium as defined above chosen from compounds of the metal not reacted in step (a) to form a second composition; thereafter (c) reacting said second composition with an organoaluminium compound to form a third composition; and (d) reacting said third composition with titanium tetrahalide to form the catalyst composite.

It is an object of the present invention to provide an improved supported Ziegler catalyst component and to provide an improved polymerisation catalyst based thereon.

It is a further object of the present invention to provide a supported Ziegler catalyst component which can be used together with a conventional organometallic activator to make a catalyst having good activity and good hydrogen sensitivity and capable of polymerising 1-olefins, for example ethylene, to give polyolefins having relatively broad molecular weight distribution.

Accordingly, the present invention provides a supported Ziegler catalyst component comprising the product obtained by (A) reacting together a refractory oxide support material having surface hydroxyl groups and one or more halogen-containing transition metal compounds, the transition metal being one or more selected from Groups 4b, 5b, 6b, 7b and 8 of the Periodic Table, (B) reacting the product obtained from step A with one or more organometallic compounds having the general formula $MR^1_aQ_{b-a}$ wherein M is a metal selected from aluminium, boron, lithium, zinc, magnesium, silicon and tin, $R^1$ is a hydrocarbyl group, Q is hydrogen, halogen or an oxyhydrocarbyl group, b is the valency of M and a is an integer from 1 to b, (C) reacting the product from step B with one or more transition metal compounds at least one of which is a vanadium compound and which may be the same as, or different from the transition metal compound employed in step A.

Throughout this specification boron and silicon are regarded as metals.

The Periodic Table referred to throughout this specification is that shown in "Handbook of Chemistry and Physics", 59th Edition, 1978–79, published by CRC Press, Inc., as illustrated inside front cover.

In step A the refractory oxide support material is suitably any particulate oxide or mixed oxide, e.g. silica, silica-alumina, silica-magnesia, silica-titania, alumina, zirconia, thoria, titania or magnesia, having surface hydroxyl groups capable of reacting with the halogen-containing transition metal compound.

Preferred support materials are those suitable for use in the well known Phillips process for the polymerisation of ethylene (see for example UK Pat Specifications Nos. 790,195; 804,641; 853,414; French Pat. Nos. 2,015,128; 1,015,130 and Belgian pat. No. 741,437). Microspheroidal silicas and silica-aluminas having a mean particle diameter in the range 30 to 300 μm, a surface area of 50 to 1000 square meters per gram and a pore volume of 0.5 to 3.5 cc/gram are particularly preferred.

The transition metal in the halogen-containing transition metal compound employed in step A of the present invention is preferably titanium, vanadium, zirconium or chromium, most preferably titanium or vanadium or mixtures of compounds thereof. The halogen is suitably fluorine, chlorine, bromine or iodine. Chlorine is preferred. Halogen-containing titanium or zirconium compounds employed in step A preferably contain titanium or zirconium in the tetravalent state, halogen-containing vanadium compounds preferably contain vanadium in the pentavalent state and halogen-containing chromium compounds preferably contain chromium in the hexavalent state. Preferably the halogen-containing transition metal compound is selected from one or more compounds having the general formula $DY_p$, $DO_rY_{(p-2r)}$ and $D(OR^2)_s Y_{(p-s)}$ wherein D is the defined transition metal; Y is halogen, O is oxygen; $R^2$ is a hydrocarbyl group, for example alkyl, aryl or cycloalkyl preferably containing 1-10 carbon atoms; p is the valency of D; r is 1 or 2; and s is an integer from 1 to $p-1$. Examples of halogen-containing transition metal compounds suitably employed in step A are titanium tetrachloride, trichlorotitanium ethylate, dichlorotitanium diisopropylate, titanium oxychloride, vanadyl chloride, vanadium tetrachloride, zirconium tetrachloride, zirconyl chloride and chromyl chloride ($CrO_2Cl_2$). Titanium tetrachloride and vanadyl chloride are preferred.

The quantity of halogen-containing transition metal compound employed in step A of the present invention is suitably 0.001 to 100 moles, preferably 0.01 to 10.0 moles, most preferably 0.05 to 2.0 moles per mole of hydroxyl groups in the refractory oxide support material.

It is preferred to carry out the reaction in step A as a single step. It is also preferred to employ a single transition metal (as one or more compounds of said transition metal) in step A.

The reaction in step A of the present invention can be carried out, for example, by mixing or milling together the neat halogen-containing transition metal compound and the support material, by dissolving the said transition metal compound in an inert solvent and reacting the support material with the solution formed thereby, or, if the transition metal compound is volatile, the vapour thereof may be reacted with a bed of the support material. The reaction is preferably carried out by heating or refluxing a solution of the transition metal compound in an inert solvent with the support material. Preferred inert solvents include liquid hydrocarbons having a boiling point in the range 40° to 140° C., for example, cyclohexane. The reaction in step A is preferably carried out over a period of time in the range 10 minutes to 24 hours. The reaction is preferably carried out under substantially anhydrous conditions in the absence of free oxygen e.g. in an atmosphere of nitrogen, helium, argon or hydrocarbon vapour.

The product from step A is preferably separated from any transition metal compound which remains unadsorbed by the support material, for example by washing with a dry inert solvent, or, if a volatile transition metal compound has been employed, by purging with inert gas, e.g. nitrogen, helium or argon. Preferably, the separation is carried out by washing the product from step A several times with aliquots of dry hydrocarbon solvent.

In step B of the present invention, the product obtained from step A is reacted with the organometallic compound hereinbefore defined. The organometallic compound must contain at least one metal-carbon bond. Examples of organometallic compounds which can be employed are triethyl aluminium, isoprenyl aluminium, diethyl aluminium chloride, diethyl aluminium ethoxide, triethyl boron, trimethyl silyl chloride, tributyl tin hydride, dibutyl magnesium, ethyl magnesium bromide, diethyl zinc and butyl lithium. Preferred organometallic compounds are trihydrocarbyl aluminium, trihydrocarbyl boron, dihydrocarbyl zinc or magnesium, and hydrocarbyl lithium compounds. Aluminium trialkyls are particularly preferred, especially those containing 1 to 10 carbon atoms in each alkyl group.

The quantity of organometallic compound employed in step B is suitably in the range 0.01 to 10.0 moles, preferably 0.1 to 5.0 moles per mole of surface hydroxyl groups on the original refractory oxide support material.

The reaction between the organometallic compound and the product from step A can be conducted in any desired manner provided that the reaction mixture is substantially free from water, oxygen and other impurities containing reactive groups which react with the organometallic compound. The products of the reaction in step B must also be kept free of water, oxygen and other deleterious impurities. It is preferred to conduct the reaction and to maintain the products under vacuum or in an atmosphere of dry inert gas, e.g. nitrogen, helium or argon. The reaction can be conducted in the presence of an inert diluent or solvent for the organometallic compound if desired. Examples of suitable solvents are liquid hydrocarbons, for example, cyclohexane or normal-hexane. The reaction is preferably carried out in a solvent at a temperature between ambient and the bp of the solvent, for example at a temperature in the range 10°-80° C., although temperatures above or below this range can be employed if desired. The reaction between the organometallic compound and the product from step A generally occurs rapidly at ambient temperature and a reaction time of one hour or less is normally adequate although longer times can be employed if desired.

After the reaction between the organometallic compound and the product from step A is substantially complete, the unadsorbed organometallic compound, if any, can be separated from the solid product from step B if desired. The separation can be achieved, for example, by washing the solid product with an anhydrous inert solvent, for example cyclohexane, normal-hexane or petroleum ether. The solid product must be protected from contact with other substances with which it may deleteriously react, for example air.

In step C the solid product is reacted with one or more transition metal compounds at least one of which is a vanadium compound. Preferred vanadium metal compounds employed in step C are those having the general formulae $VO_yZ_{t-2v}$, $VO_v(OR^3)_{t-2v}$ and $V(OR^3)_yZ_{t-y}$ wherein Z is halogen, preferably chlorine; O is oxygen; $R^3$ is hydrocarbyl group, for example alkyl, aryl or cycloalkyl preferably containing 1-10 carbon atoms; t is the valency of the vanadium; $v=1$ or 2; and y is zero or an integer from one to t.

Examples of vanadium compounds which can be employed in step C of the present invention are vanadyl chloride, vanadium tetrachloride, and vanadyl ethylate [$VO(OEt)_3$]. Vanadyl chloride is preferred.

When it is desired to use transition metal compounds in addition to the vanadium compound in step C of the present invention, such additional transition metal compounds are selected from compounds of transition metals of Groups 4b, 5b, 6b, 7b and 8 of the Periodic Table. Titanium is a preferred additional transition metal. The additional transition metal compounds may be halogen or non-halogen containing. Examples of suitable additional transition metal compounds are halogen-containing transitional metal compounds employed in step A of the present invention, or non-halogen containing transition metal compounds, for example transition metal alkylates or acetyl acetonates.

The quantity of vanadium compound (or transition metal compound including vanadium) employed in step C of the present invention is suitably in the range 0.001 to 100 moles, preferably 0.01 to 10.0 moles, most preferably 0.05 to 2.0 moles per mole of hydroxyl groups in the original support material.

When it is desired to employ additional transition metal compounds in step C, suitably the quantity of vanadium compound employed is at least sufficient to give 10 mols % of vanadium compound based on the total quantity of transition metal employed in step C. Preferably the quantity is at least sufficient to give 50 moles %, most preferably 80 moles % based on total transition metal compound employed in step. C.

The atomic ratio of transition metal employed in step A to vanadium employed in step C is suitably in the range of 1:100 to 100:1, preferably 1:20 to 20:1, most preferably 1:10 to 2:1.

Precautions must be taken in step C to prevent water, oxygen or other deleterious materials from containing the reaction or products thereof. p The reaction in step C of the present invention can be carried out using the neat (undiluted) vanadium compounds or by dissolving the vanadium compound(s) in an inert solvent, for example a liquid hydrocarbon solvent. The inert solvent when used must be free from functional groups capable of reacting with the solid material obtained from step B and the vanadium compound(s). Cyclohexane is an example of an suitable inert solvent. The reaction is preferably carried out by contacting the solid material obtained from step B with the vanadium compound(s) at a temperature in the range 10° to 150° C. It is preferred to carry out the impregnation by stirring the mixture of said solvent material and vanadium compound(s) in an inert solvent at a temperature in the range 10° to 30° C. The contacting in the reaction step C is preferably carried out for a time in the range 10 minutes to 24 hours. When it is desired to employ one or more additional transition metal compounds in step C, these can be incorporated in a similar manner to the vanadium compound.

The catalyst component obtained from step C is preferably separated from any unabsorbed transition metal compound by conventional means, for example, washing with dry inert solvent, or, if volatile transition metal compound(s) have been employed, by purging with inert gas, e.g. nitrogen, helium or argon. Preferably the separation is carried out by washing the catalyst component several times with aliquots of dry hydrocarbon solvent. The catalyst component may be stored as the dry material under vacuum or in a suitable non-reactive atmosphere, e.g. agron, nitrogen or other inert gas or as a slurry in inert solvent.

The present invention further comprises a process for polymerizing one or more 1-olefins comprising contacting the monomer under polymerisation conditions with the catalyst component of the present invention preferably in the presence of a Ziegler catalyst activator. Ziegler catalyst activators and the methods in which they are used to activate Ziegler catalysts are well known. Ziegler catalyst activators are organometallic derivatives or hydrides of metals of Groups I, II, III, and IV of the Periodic Table. Particularly preferred are trialkyl aluminium compounds or alkylaluminium halides, for example triethylaluminium, tributylaluminium and diethylaluminium chloride. The quantity of Ziegler catalyst activator employed is preferably an amount such that the atomic ratio of metal atoms in the activator:total transition metal present in the catalyst component is in the range 1:2 to 10:1.

The polymerisation process of the present invention can be applied to the homopolymerisation of 1-olefins, e.g. ethylene or propylene, or to the copolymerization of mixtures of 1-olefins, e.g. ethylene with propylene, 1-butene, 1-pentene, 1-hexane, 4-methyl-pentene-1, 1,3-butadiene or isoprene. The process is particularly suitable for the homopolymerisation of ethylene or the copolymerisation of ethylene with up to 40% weight (based on total monomer) of comonomers.

The polymerisation conditions can be in accordance with known techniques used in supported Ziegler polymerisation. The polymerisation can be carried out in the gaseous phase or in the presence of a dispersion medium in which the monomer is soluble. As a liquid dispersion medium, use can be made of an inert hydrocarbon which is liquid under the polymerisation conditions, or of the monomer or monomers themselves maintained in the liquid state under their saturation pressure. The polymerisation can if desired be carried out in the presence of hydrogen gas or other chain transfer agent to vary the molecular weight of the produced polymer.

The polymerisation is preferably carried out under conditions such that the polymer is formed as solid particles suspended in a liquid diluent. Generally the diluent is selected from paraffins and cycloparaffins having from 3—30 carbon atoms per molecule. Suitable diluents include for example isopentane, isobutene, and cyclohexane. Isobutane is preferred.

Methods of recovering the product polyolefin are well known in the art.

The polymerization process of the present invention can be used to make high density ethylene polymers and copolymers at high productivity having properties which render them suitable for a variety of applications. The molecular weight distribution (MWD) of polyolefins produced using the catalyst of the present invention may be adjusted, for example, by altering the atomic ratio of step A transition metal: step C vanadium in the catalyst component. In general, replacement of a particular transition metal compound employed in step A by another transition metal compound within the present invention leads to a change in MWD. The catalyst exhibits good hydrogen sensitivity, i.e. the melt index of the produced polyolefins can be varied widely by employing hydrogen at different concentrations as chain transfer agent in the polymerisation process.

The invention is further illustrated by the following Examples.

In the Examples the melt index ($MI_{2 \cdot 16}$) and high load melt index ($MI_{21 \cdot 6}$) were determined according to ASTM method D 1238 conditions E and F respectively; the units are grams per 10 minutes.

Kd is a numerical measure of the molecular weight distribution of the polymer and is determined by a method similar to that disclosed in Sabia, R., J. Appl, Polymer Sci., 1963, 7, 347. Kd increases for a given $MI_{21 \cdot 6}$ as the molecular weight distribution broadens.

EXAMPLES 1 and 2

Catalyst Preparation

The following procedure was used for catalyst component preparation (the quantities of reagents used and analyses of the dried catalysts are shown in Table 1): all steps of the catalyst component preparation were carreid out in an atmosphere of dry nitrogen.

In step A silica (Davison Grade 951) was dried overnight under vacuum at 150°C. 10 g of the dried material were suspended in dry cyclohexane (150ml) in a vessel purged with dry nitrogen. Titanium tetrachloride dissolved in cyclohexane (ca. 1M solution) was added dropwise with stirring. The resulting mixture was heated under reflux, with stirring, for 2 hours. The mixture was allowed to cool and settle and the supernatant liquor decanted off. The solid product from step A was washed with cyclohexane (3×250 ml), and a further 150 ml of fresh dry cyclohexane added. In step B triethyl aluminium (10% w/w solution in hexane) was added dropwise with stirring over ca. 15 min. Stirring was continued for a further 1 hour to ensure complete reaction. The slurry in step B was allowed to settle, the liquor decanted off and a further 150 ml of cyclohexane added. In step C vanadyl chloride dissolved in cyclohexane (ca. 1M solution) was added dropwise with stirring to the washed slurry from step B. Stirring was continued for 1 hour after the addition was complete. The mixture was allowed to settle, the liquor decanted off and fresh dry cyclohexane added to bring the total volume ot the final slurry to ca. 350 ml. The produced catalyst component slurry was stored under nitrogen.

Polymerisation

Polymerisations were carried out in a 2.3 liter stainless steel stirred autoclave. The reactor was purged with nitrogen, baked for 2 hours at 110° C., then cooled to 75° C. The catalyst component slurry was added to the reactor by means of a syringe. Triethylaluminium co-catalyst (0.5 ml, 10% w/w solution in hexane) was mixed with 1 liter of dry isobutane and the mixture charged to the reactor. The vessel was reheated to 90° C. and hydrgen (4.1 bar) added. Ethylene was added to bring the total pressure in the reactor to 41.4 bar. Ethylene was added continuously throughout the run to maintain this pressure, the temperature being maintained at 90° C. throughout the polymerisation.

At the end of the run (after 1 hour) the diluent and unreacted ethylene were vented off and the polymer powder recovered.

Polymerisation data and the properties of the polymers produced are summarized in Table 2.

EXAMPLES 3, 4 AND 5 COMPARATIVE TESTS A, B AND C

Catalyst Preparation

The catalyst components in these Examples and tests were prepared in a similar manner to that used in Examples 1 and 2 using the transition metal compounds shown in Table 3. The quantities of reagents used and analyses of the dried catalyst components are given in Table 3.

Polymerisation

Polymerisations were carried out as in Example 1 and 2. Different levels of hydrogen and triethylaluminium co-catalyst were added to the reactor as shown in table 4.

TABLE 1

Quantities of reagents used and analyses of catalyst component (weights of reagents for 10g silica support)

| Example | Step A Wt. TiCl$_4$ (g) | Step B Wt. AlEt$_3$ (g) | Step C Wt. VOCl$_3$ (g) | Analysis | | | |
|---|---|---|---|---|---|---|---|
| | | | | % Ti | % Al | % V | % Cl |
| 1 | 1.5 | 3.5 | 2.5 | 2.5 | 4.2 | 5.1 | 12.9 |
| 2 | 1.5 | 2.5 | 2.5 | 2.3 | 4.5 | 5.0 | 12.6 |

TABLE 2

Polymerisation data and properties of polymers produced

| Ex | Catalyst weight (mg) | Polymer yield (g) | Activity (kg/kgh) | MI$_{2.16}$ (g/10 min) | MI$_{21.6}$ (g/10 min) | Kd |
|---|---|---|---|---|---|---|
| 1 | 108 | 214 | 1980 | 0.24 | 11.4 | 3.1 |
| 2 | 127 | 230 | 1810 | 0.10 | 8.9 | 7.0 |

Table 4 also shows polymerisation data, and the properties of the polymers produced. The Kd of the polymer produced in Example 5 was not measured.

Examples 1–5 show that the catalyst component and polymerisation process of the present invention can be used to make polyethylene at high catalyst productivity. It will be observed from the Tables that the produced samples of polyethylene had a variety of melt indices and differing molecular weight distributions. For example, comparison of Examples 2 and 3 shows that reduction of the quantity of titanium tetrachloride employed in step A has led to an increase in the melt index of the produced polyethylene.

Comparison of Example 3 with Test A shows that the catalyst of the present invention has greater hydrogen sensitivity (note higher MI even though a lower hydrogen partial pressure was used) than a similar catalyst in which titanium was sole transition metal. The polymer obtained from Example 3 also had a broader molecular weight distribution as can be seen from the higher Kd.

Comparision of Example 4 with Test B shows that the order in which the transition metal compounds are added is critical in obtaining the improved results in the present invention. Thus although similar quantities of titanium an vanadium compounds were employed, the addition of titanium in step A and vanadium in step C in accordance with the present invention has led to the production of polyethylene having boarder molecular weight distribution. The catalyst activity and hydrogen sensitivity of the Example 4 catalyst are superior to the Test B catalyst.

Example 5 demonstrates that the use of a combination of different transition metal compounds (titanium and vanadium) in accodance with the present invention leads to a catalyst having higher activity than is the case when the vanadium is employed in step A rather than in step C (as in Test C).

TABLE 3

Quantities of reagents used and analyses of catalyst component

| Example or Test | Step A | | | Step B | Step C | | Analysis | | | |
|---|---|---|---|---|---|---|---|---|---|---|
| | Wt. SiO$_2$ (g) | Wt. TiCl$_4$ (g) | Wt. VOCl$_3$ (g) | Wt. AlEt$_3$ (g) | Wt. TiCl$_4$ (g) | Wt. VOCl$_3$ (g) | % Ti | % Al | % V | % Cl |
| 3 | 10 | 0.5 | — | 2.5 | — | 2.5 | 0.9 | 4.7 | 5.1 | 10.9 |
| A | 10 | 0.5 | — | 2.5 | 2.5 | — | 4.0 | 4.8 | — | 12.1 |

TABLE 3-continued

| Example or Test | Quantities of reagents used and analyses of catalyst component | | | | | | | | | |
|---|---|---|---|---|---|---|---|---|---|---|
| | Step A | | | Step B | Step C | | Analysis | | | |
| | Wt. $SiO_2$ (g) | Wt. $TiCl_4$ (g) | Wt. $VOCl_3$ (g) | Wt. $AlEt_3$ (g) | Wt. $TiCl_4$ (g) | Wt. $VOCl_3$ (g) | % Ti | % Al | % V | % Cl |
| 4 | 7 | 0.7 | — | 2.1 | — | 1.2 | 1.8 | 5.3 | 3.8 | 8.2 |
| B | 7 | — | 1.2 | 2.1 | 0.7 | — | 1.9 | 5.4 | 3.2 | 7.0 |
| 5 | 7 | 0.35 | — | 2.1 | 0.17 | 0.5 | 1.5 | 5.7 | 1.6 | 5.1 |
| C | 7 | 0.17 | 0.5 | 2.1 | 0.35 | — | 1.4 | 4.7 | 1.4 | 4.3 |

TABLE 4

| Example or Test | Polymerization data and properties of polymers produced | | | | | | | |
|---|---|---|---|---|---|---|---|---|
| | Catalyst Wt. (mg) | Vol. 10% $AlEt_3$ soln. (ml) | $H_2$ pressure (bar) | Polymer Yield (g) | Activity (kg/kg h) | $MI_{2.16}$ (g/10 min) | $MI_{21.6}$ (g/10 min) | Kd |
| 3 | 115 | 0.5 | 4.1 | 192 | 1670 | 0.90 | 50.9 | 7.4 |
| A | 71 | 0.3 | 6.9 | 79 | 1110 | 0.14 | 8.0 | 3.3 |
| 4 | 102 | 0.5 | 5.2 | 100 | 980 | 1.1 | 53.0 | 7.5 |
| B | 100 | 0.5 | 5.2 | 35 | 350 | 0.06 | 3.5 | 2.4 |
| 5 | 101 | 0.3 | 5.2 | 61 | 600 | 0.12 | 5.2 | — |
| C | 60 | 0.3 | 5.2 | 13 | 220 | — | — | — |

I claim:

1. A supported Ziegler catalyst component comprising the product obtained by
 (A) reacting together a refractory oxide support material having surface hydroxyl groups and one or more halogen-containing transition metal compounds, the transition metal being one or more selected from Groups 4b, 5b, 6b, and 8 of the Periodic Table,
 (B) reacting the product obtained from step A with one or more organometallic compounds having the general formular $MR^1_aQ_{b-a}$ wherein M is a metal selected from aluminium, boron, lithium, zinc, magnesium, silicon and tin, $R^1$ is a hydrocarbyl group, Q is hydrogen halogen or an oxyhydrocarbyl group, b is the valency of M and a is an integer from 1 to b,
 (C) reacting the product from step B with one or more transition metal compounds at least one which is a vanadium compound and which may be the same or different from the transition metal compound employed in step A.

2. A catalyst component as claimed in claim 1 wherein the refractory oxide is silica.

3. A catalyst component as claimed in claim 1 or 2 wherein the halogen-containing transition metal compound employed in step A is a titanium compound, a vanadium compound or mixtures thereof.

4. A catalyst component as claimed in claim 1 or 2 wherein the organometallic compound employed in step B is an aluminium trialkyl.

5. A catalyst component as claimed in claim 1 or 2 wherein the vanadium compound employed in step C is vanadyl chloride, vanadium tetrachloride or vanadyl ethylate.

6. A catalyst component as claimed in claim 1 or 2 wherein the transition metal compound employed in step C comprises a titanium compound in addition to the vanadium compound.

7. A catalyst component as claimed in claim 1 or 2 wherein the quantity of transition metal compound employed in step A is 0.01 to 10.0 moles per mole of hydroxy groups in the refractory oxide support material.

8. A catalyst component as claimed in any claim 1 or 2 wherein the quantity of organometallic compound employed in step B is the range 0.1 to 5.0 moles per mole of hydroxyl groups on the original refractory oxide support material.

9. A catalyst component as claimed in claim 1 or 2 wherein the quantity of vanadium compound (or transition metal including vanadium) employed in step C is in the range 0.01 to 10.0 moles per mole of hydroxyl groups in the original refractory oxide support material.

10. A cata;lyst component as claimed in any claim 1 or 2 wherein the atomic ratio of transition metal employed in step A to vanadium (or transition metal including vanadium) employed in step C is in the range 1:20 to 20:1.

11. A polymerisation catalyst comprising the catalyst component claimed in claim 1 or 2 together with an activator selected from a trialkyl aluminium compound or an alkylaluminium halide.

* * * * *

UNITED STATES PATENT AND TRADEMARK OFFICE
CERTIFICATE OF CORRECTION

PATENT NO. : 4,383,939
DATED : May 17, 1983
INVENTOR(S) : ALEXANDER JOHNSTONE

It is certified that error appears in the above—identified patent and that said Letters Patent is hereby corrected as shown below:

Col. 5, l. 20, "containing" should read --contaminating--

Col. 5, l. 21, delete "p" after "thereof".

Col. 5, l. 29, change "an suitable" to --a suitable--.

Col. 5, l. 52, "agron" should read --argon--.

Col. 6, l. 7, "1-hexane" should read --1-hexene--.

Col. 6, l. 31, "isobutene" should read --isobutane--.

Claim 1, line 33, insert --7b,-- after "6b".

Claim 1, l. 44, insert --of-- after "one" and before "which".

Claim 8, l. 37, before "claim", delete "any".

Claim 8, l. 39, insert --in-- after "is" and before "the".

Claim 10, l. 47, delete "any" before "claim".

Claim 10, l. 47, correct the spelling of "catalyst".

Signed and Sealed this

Twenty-ninth Day of May 1984

[SEAL]

Attest:

GERALD J. MOSSINGHOFF

Attesting Officer

Commissioner of Patents and Trademarks